United States Patent [19]
Prieto et al.

[11] Patent Number: 6,146,670
[45] Date of Patent: *Nov. 14, 2000

[54] NUTRITIONAL FORMULATIONS CONTAINING OLIGOSACCHARIDES

[75] Inventors: Pedro A. Prieto, West Worthington; Stephen J. Kirchner, Westerville; Renée M. Erney, Columbus, all of Ohio

[73] Assignee: Abbott Laboratories, Abbott Park, Ill.

[*] Notice: This patent is subject to a terminal disclaimer.

[21] Appl. No.: 09/216,056

[22] Filed: Dec. 18, 1998

Related U.S. Application Data

[63] Continuation of application No. 08/829,157, Mar. 31, 1997, Pat. No. 6,045,854.

[51] Int. Cl.[7] ............................. A23L 1/29; A23L 1/302; A23L 1/303; A23L 1/304
[52] U.S. Cl. ............................. 426/72; 426/73; 426/74; 426/580; 426/658; 426/801
[58] Field of Search .................................. 426/580, 801, 426/658, 72, 73, 74

[56] References Cited

U.S. PATENT DOCUMENTS

| | | | |
|---|---|---|---|
| 4,919,961 | 4/1990 | Lundblad | 426/580 |
| 4,925,680 | 5/1990 | Schweikhardt | 426/585 |
| 4,963,384 | 10/1990 | Heine | 426/582 |
| 5,095,106 | 3/1992 | Gaffar et al. | 426/658 |
| 5,750,176 | 5/1998 | Prieto et al. | 426/580 |

FOREIGN PATENT DOCUMENTS

| | | |
|---|---|---|
| 0313533 | 4/1989 | European Pat. Off. . |
| 9116449 | 10/1991 | WIPO . |
| 9610086 | 4/1996 | WIPO . |

OTHER PUBLICATIONS

A. Kobata et al., "Oligosaccharides of Human Milk II" Journal of Biological Chemistry vol. 244, No. 20, Oct. 25, 1969, MD US, pp. 5496–5502, XP002071966.
S. Thurl et al., *"Variations of Neutral Oligosaccharides and Lactose in Human Milk During the Feeding"* vol. 32, No. 41, 1993, pp. 262–269, XP002071967.
Patent Abstracts of Japan, vol. 096, No. 006, Jun. 28, 1996 & JP 08 038064A Feb. 13, 1996.
Thurl, S. et al., Journal of Chromatography 568 (1991) 291–300.
Andersson, B. et al., J. Infect. Dis. 153 (1986) 232–237.
Kobata, A. et al., Methods in Enzymology 28 (1972) 262–271.
Kunz, C. et al., Acta Paediatr. 82 (1993) 903–912.
Thurl, S. et al., Analytical Biochemistry 235 (1996) 202–206.

*Primary Examiner*—Helen Pratt
*Attorney, Agent, or Firm*—Cheryl L. Becker

[57] ABSTRACT

A nutritional formulation containing at least one of the following oligosaccharides: from about 400 to about 3500 mg/L of 3-fucosyllactose; from about 200 to about 2200 mg/L of lacto-N-fucopentaose III; from about 100 to about 1500 mg/L of lacto-N-fucopentaose II; from about 100 to about 2500 mg/L of difucosyllactose; from about 500 to about 4500 mg/L of 2' fucosyllactose; from about 250 to about 3300 mg/L of lacto-N-fucopentaose I; from about 100 to about 900 mg/L of Lacto-N-neoTetraose; from about 50 to about 2300 mg/L of lacto-N-fucopentaose V; or from about 300 to about 2800 mg/L of lacto-N-tetraose.

6 Claims, 3 Drawing Sheets

NUTRITIONAL FORMULATIONS CONTAINING OLIGOSACCHARIDES

CROSS REFERENCE TO RELATED APPLICATIONS

The present application is a Continuation of allowed U.S. patent application Ser. No. 08/829,157 filed on Mar. 31, 1997, now U.S. Pat. No. 6,045,854 which was filed on the same date as the related application corresponding to U.S. Pat. No. 5,945,314, and which was also filed on the same date as the related application corresponding to U.S. Pat. No. 5,906,982, all of which are herein incorporated in their entirety by reference.

TECHNICAL FIELD OF THE INVENTION

The present invention relates generally to the composition of synthetic nutritional products containing oligosaccharides from human milk. More specifically, the synthetic nutritional product contains at least one of the following oligosaccharides: 3-fucosyllactose, lacto-N-fucopentaose III, lacto-N-fucopentaose II, difucosyllactose, 2' fucosyllactose, lacto-N-fucopentaose I, lacto-N-neotetraose, lacto-N-fucopentaose V or lacto-N-tetraose.

BACKGROUND OF THE INVENTION

Human milk is well-known to contain more than 100 different oligosaccharides, some of which are genetically determined. Unfortunately, the structural similarities of many of these carbohydrates have made it difficult to isolate, identify, and quantify many of these oligosaccharides. Most of the published works on these oligosaccharides have studied these compounds as classes rather than as individual oligosaccharides.

Previous work has shown that certain oligosaccharides may be beneficial biologically. For example, oligosaccharides containing N-acetylglucosamine (GlcNAc) have been demonstrated to stimulate the growth of Lactobacillus bifidus var pennsylvanicus, which protects infants from gastrointestinal infections (Coppa, G., et al., Pediatrics 91:3 (1993) 637–641, this reference as well as all patents and publications cited herein are incorporated by reference). Other reports indicate that human milk oligosaccharides promote growth of the beneficial bacteria Bifidobacterium bifidum, which is assumed to be involved in the healthy development of infants (Thurl, S., et al., Journal of Chromatography 568 (1991) 291–300). In one study, human milk prevented the attachment of Streptococcus pneumoniae and Haemophilus influenzae (Andersson, B., et al., J. Infect. Dis. 153 (1986) 232–237). This study further proved that this decrease in attachment was "due mainly to components other than the specific antibodies" present in the milk and may be caused by the "receptor-active oligosaccharide determinants on glycoproteins". Pneumococcal attachment was inhibited by both high and low molecular weight fractions, specifically lactose-N-tetraose (LNT, Galβ1-4GlcNAcβ1-4Galβ1-4Glc) and lactose-N-neotetraose (LNnT, Galβ1-4GlcNAcβ1-3Galβ1-4Glc) (Anderson, B., et al., J. Infect. Dis. 153 (1986) 232–237). In general, oligosaccharides can inhibit the binding of bacteria to epithelial cells, acting as decoys by competing with cell receptors. Additionally, oligosaccharides protect infants from viral and bacterial infections of the respiratory, gastrointestinal, and urogenital tracts.

Genetics play a large part in the presence or absence of certain oligosaccharides in milk from different donors, an attribute which is linked to the Lewis blood group status of the individual. The "Secretor" and "Lewis" genes encode specific glycosyltransferases. These enzymes in turn produce a variety of secondary gene products, specifically, oligosaccharides and other glycoconjugates. The presence or absence of glycosyltransferases in the lactating mammary gland has a direct impact on the existence and quantity of certain carbohydrate structures found in human milk from a given donor.

Many beneficial functions have been attributed to human milk oligosaccharides. For this reason, the supplementation of infant formulas and other pediatric nutritional products with human milk oligosaccharides is desirable. An infant formulation supplemented with oligosaccharides near the naturally occurring levels of such oligosaccharides in human breast milk would be most beneficial. The natural levels of specific human milk oligosaccharides have been obtained from pooled milk samples (Kobata, A., Methods in Enzymology 28 (1972) 262–271; Kunz, C., et al., Acta Paediatr. 82 (1993) 903–912) or by using methods that required heating the samples, thus destroying labile oligosaccharides (Thurl, S. et al., Analytical Biochemistry 235 (1996) 202–206). Also, averages have been published for some oligosaccharide concentrations (See Thurl, S., et al, Ana. Biochem. 235 (1996) 202–206; Thurl, S., et al., J. Chromat. 565 (1991) 291–300), but the variability of these oligosaccharides has not been established because of the large amount of human milk samples necessary to achieve statistical significance. Because of these difficulties, at the present time, an infant formulation containing oligosaccharides near the naturally occurring levels found in human breast milk is not available.

BRIEF SUMMARY OF THE INVENTION

The present invention provides a synthetic nutritional formulation that contains at least one of the following oligosaccharides in the recited concentration ranges: from about 130 to about 3500 mg/L of 3-fucosyllactose; from about 120 to about 2200 mg/L of lacto-N-fucopentaose III; from about 100 to about 1500 mg/L of lacto-N-fucopentaose II; from about 50 to about 2500 mg/L of difucosyllactose; from about 350 to about 4500 mg/L of 2' fucosyllactose; from about 50 to about 3300 mg/L of lacto-N-fucopentaose I; from about 100 to about 900 mg/L of Lacto-N-neoTetraose; from about 15 to about 2300 mg/L of lacto-N-fucopentaose V; or from about 120 to about 2800 mg/L of lacto-N-tetraose.

The present invention further provides a synthetic nutritional formulation that contains at least one of the following oligosaccharides in the recited concentration ranges: from about 130 to about 3500 mg/L of 3-fucosyllactose; from about 120 to about 2200 mg/L of lacto-N-fucopentaose III; from about 100 to about 1500 mg/L of lacto-N-fucopentaose II; from about 50 to about 2500 mg/L of difucosyllactose; from 350 to about 4500 mg/L of 2 fucosyllactose; from about 50 to about 3300 mg/L of lacto-N-fucopentaose I; from about 100 to about 900 mg/L of lacto-N-neotetraose; from about 15 to about 2300 mg/L of lacto-N-fucopentaose V; of from about 120 to about 2800 mg/L of lacto-N-tetraose and edible macronutrients formulated for feeding to an infant such as one or more of coconut oil, soy oil, mono and diglycerides, glucose, food grade lactose, electrodialysed whey, electrodialysed skim milk and milk whey, one or more of vitamins A, C, D, E and B complex, and one or more of minerals calcium, magnesium, manganese, sodium, potassium, phosphorus, copper, zinc chloride, iodine, selenium and iron.

DESCRIPTION OF THE DRAWINGS

FIG. 2 shows two chromatograms comparing the oligosaccharide profiles of human milk from secretor and nonsecretor donors.

FIG. 3 shows two chromatograms comparing the oligosaccharide profiles of human milk from Lewis-positive and Lewis-negative donors.

DETAILED DESCRIPTION OF THE INVENTION

The present invention provides a synthetic nutritional formulation that contains at least one of the following oligosaccharides:

| Name: | Abbreviation: | Structure: |
|---|---|---|
| 3-Fucosyllactose | 3-FL | Galβ1–4(Fucα1–3)Glc |
| Lacto-N-Fucopentaose III | LNF-III | Galβ1–4(Fucα1–3)GlcNAcβ1–Galβ1–4Glc |
| Lacto-N-Fucopentaose II | LNF-II | Galβ1–3(Fucα1–4)GlcNAcβ1–3Galβ1–4Glc |
| Difucosyllactose | DFL | Fucα1–2Galβ1–4(Fucα1–3)Glc |
| 2'-Fucosyllactose | 2'-FL | Fucα1–2Galβ1–4Glc |
| Lacto-N-Fucopentaose I | LNF-I | Fucα1–2Galβ1–3GlcNAcβ1–3Galβ1–4Glc |
| Lacto-N-neoTetraose | LNnT | Galβ1–4GlcNAcβ1–3Galβ1–4Glc |
| Lacto-N-Fucopentaose V | LNF-V | Galβ1–3GlcNAcβ1–3Galβ1–4(Fucα1–3)Glc |
| Lacto-N-Tetraose | LNT | Galβ1–3GlcNAcβ1–3Galβ1–4Glc |

All of these oligosaccharides are naturally occurring oligosaccharides found in human breast milk. As is well known in the art, Gal designates galactose, GlcNAc designates N-acetylglucosamine, Glc designates glucose, and Fuc designates fucose.

The synthetic nutritional formulation of the present invention contains edible macronutrients, vitamins and minerals in amounts desired for a particular use. The amounts of such ingredients will vary depending on whether the formulation is intended for use with normal, healthy infants, children, adults or subjects having specialized needs such as those accompany certain pathological conditions (e.g., metabolic disorders). It will be understood by persons skilled in the art that the components utilized in a nutritional formulation of the present invention are of semi-purified or purified origin. By semi-purified or purified is meant a material which has been prepared by purification of a natural material or by synthesis. These techniques are well known in the art (See, e.g., Code of Federal Regulations for Food Ingredients and Food Processing; Recommended Dietary Allowances, 10th Ed., National Academy Press, Washington D.C., 1989).

In a preferred embodiment, the synthetic nutritional formulation of the present invention is an infant enteral nutritional product. Accordingly, in a further aspect of the invention, a nutritional formulation is provided that is suitable for feeding to infants. The formula comprises, in addition to the above described oligosaccharides, vitamins and minerals in amounts designed to provide the daily nutritional requirements of infants. It is important to note that antimicrobial factors in human milk, or in infant formulas, may reach an infant's respiratory tract directly as a result of regurgitation and inhalation of these factors during and after feeding. The mucosa of the respiratory tract may therefore gain direct protection in this manner.

The macronutritional components include for example, edible fats, carbohydrates and proteins. Exemplary edible fats are coconut oil, soy oil, and mono- and diglycerides. Exemplary carbohydrates are glucose, food grade (edible) lactose and hydrolyzed cornstarch. A typical protein source would be for example, soy protein, electrodialysed whey or electrodialysed skim milk or milk whey, or the hydrolysates of these proteins, although other protein sources are also available and may be used. These macronutrients would be added in the form of commonly accepted nutritional compounds in an amount equivalent to those present in human milk on an energy basis, i.e., on a per calorie basis.

The infant formula would preferably include the following vitamins and minerals: calcium, phosphorous, potassium, sodium, chloride, magnesium, manganese, iron, copper, zinc, selenium, iodine, and Vitamins A, E, D, C, and the B complex.

The infant formula can be sterilized and subsequently utilized on a ready-to-feed (RTF) basis or stored in a concentrated liquid or a powder. The powder can be prepared for example, by spray drying the infant formula prepared as indicated above, and the formula can be reconstituted for example, by rehydrating the concentrate. Infant nutritional formulas are well known in the art and commercially available (e.g., Similac® and Alimentum® from Ross Products Division, Abbott Laboratories).

Actual dosage levels of the oligosaccharides in the formulations of the present invention may be varied so as to obtain an amount of active ingredient that is effective to obtain a desired response for a particular composition and method of administration. The selected dosage level therefore depends upon the desired therapeutic effect, on the route of administration, on the desired duration of administration and on other factors.

In a preferred embodiment, the oligosaccharides are present in the formulation near the naturally occurring levels of such oligosaccharides found in human breast milk. The synthetic formulation contains:

from about 130 to about 3500 mg/L, preferably from about 800 to about 1750 mg/L, and more preferably from about 1456 to about 1472 mg/L, of 3-FL;

from about 120 to about 2200 mg/L, preferably from about 400 to about 1100 mg/L, and more preferably from about 507 to about 578 mg/L, of LNF-III;

from about 100 to about 1500 mg/L preferably from about 200 to about 750 mg/L and more preferably from about 361 to about 429 mg/L, of LNF-II;

from about 50 to about 2500 mg/L, preferably from about 200 to about 1450 mg/L, and more preferably from about 393 to about 494 mg/L, of DFL;

from about 350 to about 4500 mg/L, preferably from about 1000 to about 2400 mg/L and more preferably from about 2240 to about 2260 mg/L, of 2'FL;

from about 50 to about 3300 mg/L, preferably from about 500 to about 1650 mg/L, and more preferably from about 845 to about 912 mg/L, of LNF-I;

from about 100 to about 900 mg/L, preferably from about 200 to about 450 mg/L, and more preferably from about 258 to about 279 mg/L, of LNnT;

from about 15 to about 2300 mg/L, preferably from about 100 to about 1600 mg/L, and more preferably from about 120 to about 154 mg/L, of LNF-V; and from about 120 to about 2800 mg/L, preferably from about 600 to about 1400 mg/L, and more preferably from about 687 to about 744 mg/L, of LNT.

The oligosaccharides used in the nutritional formulation of this invention can be prepared in any manner, preferably, by chemical synthesis. For example, oligosaccharides for use in this invention can be synthesized chemically by enzymatic transfer of saccharide units from donor moieties to acceptor moieties using glycosyltransferases as described in U.S. Pat. No. 5,288,637 and WO96/10086, herein incorporated by reference. The preferred method for synthesizing the oligosaccharides involves the enzymatic transfer of saccharide units from saccharide-nucleotides to saccharide acceptors using glycosyltransferases where the saccharide-nucleotides and glycosyltransferases used are in an unpurified form. This preferred method is described in the patent application entitled "A Process for Synthesizing Oligosaccharides" filed concurrently with this application. Additionally, the oligosaccharides used in the nutritional formulation should be in purified form and free of bacterial toxins, viruses and other harmful contaminants.

The following examples illustrate preferred embodiments of the present invention and are not limiting of the claims and specification in any way.

EXAMPLE 1

Oligosaccharide Extraction from Human Milk Samples

Collection/Storage of Human Milk Samples

Milk samples were collected through 5 different means:
1. The Center for Pediatric Research, Eastern Virginia Medical School, Norfolk, Va.
2. The University of Chile, Division of Medical Science Orient, Santiago, Chile.
3. Department of Infectious Diseases, National Institute of Nutrition, Mexico.
4. Clinical Study No. W93-180, Abbott International Division, North Chicago, Ill.
5. Children's Hospital, Columbus, Ohio
6. Dr. Milo Hilty, Ross Laboratories, Columbus, Ohio All samples were collected by external pump and were stored frozen until shipped to Abbott Laboratories, Ross Products Division, Columbus, Ohio, where they were kept at −70° C. until analyzed.

Extraction of Oligosaccharides from Milk Samples

Milk samples to be tested were thawed slowly at room temperature. After mixing well, 0.75 mL were pipetted into Centricon 10,000 molecular-weight cut-off filters (Amicon, Inc., Beverly, Mass.). The milk samples were centrifuged for 2 hours at 2,000 RCF at 15–18° C. Approximately 100 to 400 $\mu$L clear colorless filtrate was obtained for each sample. The filtrates were stored frozen at −70° C. until used.

Removal of Excess Lactose

For oligosaccharide analysis, excess lactose needed to be removed to quantitate the lower amounts of oligosaccharides present. To complete this, 186 $\mu$L thawed, mixed filtrate was diluted with 14 $\mu$L isopropyl alcohol. 100 $\mu$L of this dilution was injected onto a BioGel P2 size-exclusion chromatography column (BioRad Inc., Hercules, Calif.) equipped with a Refractive Index Detector and a fraction collector. The samples were eluted using 1.0 mL/min flow of filtered, degassed 7% IPA supplied by an HPLC pump. 4.0 mL fractions were collected. With the exception of the void volume (fraction #1, containing very large molecular-weight compounds), all fractions prior to the bulk of the lactose were dried. Excess lactose-containing fractions, and those that eluted later off the column, were discarded. The desired fractions were dried overnight in a Savant Speed-Vac equipped with a refrigerated trap and vacuum pump. They were pooled/resuspended in 800 $\mu$L 7% IPA, and analyzed.

EXAMPLE 2

Identification and Quantification of Oligosaccharides from Human Milk Samples

Oligosaccharide Analysis by High-Pressure Anion-Exchange Chromatography

Samples from Example 1 were analyzed using a Dionex Bio-LC system, equipped with a Pulsed-electrochemical detector. Two CarboPac PA-1 analytical columns were connected in serial by a very short tube, and were preceded by a guard column of the same material. Conditions were as follows:

Sensitivity: 0.300, $\mu$C
Run Time: 75 minutes
Peak Width: 8.0 seconds
Peak Threshold: 25.00
Peak Area Reject: 1000
Sample Volume: 20 $\mu$L Gradient Program was:
0–60 minutes: 5 mM NaOH to 500 mM NaOH
60.1–75 minutes: 5 mM NaOH PED Program was:
Waveform:

| | |
|---|---|
| 0.00 | 0.05 |
| 0.40 | 0.05 |
| 0.41 | 0.75 |
| 0.60 | 0.75 |
| 0.61 | −0.15 |
| 1.00 | −0.15 |

Integration:

| | |
|---|---|
| 0.20 | 0.40 |

A series of 8 oligosaccharide standards from 50 to 200 ppm was analyzed with each instrument run. All standards were purchased from V-Labs, Inc. (Covington, La.). Calculations of oligosaccharide content in each sample were determined from these standard curves. A 7% IPA blank was analyzed with each instrument run, and its chromatogram was subtracted from every sample and standard chromatogram to improve the baselines of all. This was found to have no effect on the actual integration of the individual peaks.

Determination of Lactose in Filtrates

The oligosaccharide extracts were thawed at room temperature and vortexed to mix well. Each was diluted 1:1000 with 7% IPA with mixing. The samples, and a series of lactose standards, were analyzed by the using the following method:

Lactose Analysis by High-Pressure Anion-Exchange Chromatography

Samples for lactose were analyzed using the Dionex system described earlier, this time employing a single analytical CarboPac PA-1 column with guard. Conditions were as follows:

Sensitivity: 0.200 $\mu$C

Run Time: 45 minutes
Peak Width: 8.0 seconds
Peak Threshold: 25.00
Peak Area Reject: 1000
Sample Volume: 20 μL
Gradient Program was:
  0–12 minutes: 100 mM NaOH
  12.1–20 minutes: 42 mM NaOAc in 100 mM NaOH
  20.1–27 minutes: 60 mM NaOAc in 100 mM NaOH
  27.1–32 minutes: 300 mM NaOAc in 100 mM NaOH
  32.1–45 minutes: 100 mM NaOH
PED Program was:
  Waveform:

| | |
|---|---|
| 0.00 | 0.05 |
| 0.40 | 0.05 |
| 0.41 | 0.75 |
| 0.60 | 0.75 |
| 0.61 | −0.15 |
| 1.00 | −0.15 |

Integration:

| | |
|---|---|
| 0.20 | 0.40 |

A series of lactose standards from 2.5–25 g/L, were prepared, diluted 1:100, and analyzed. Lactose concentrations were calculated from these standard curves.

Results

Figure 1:
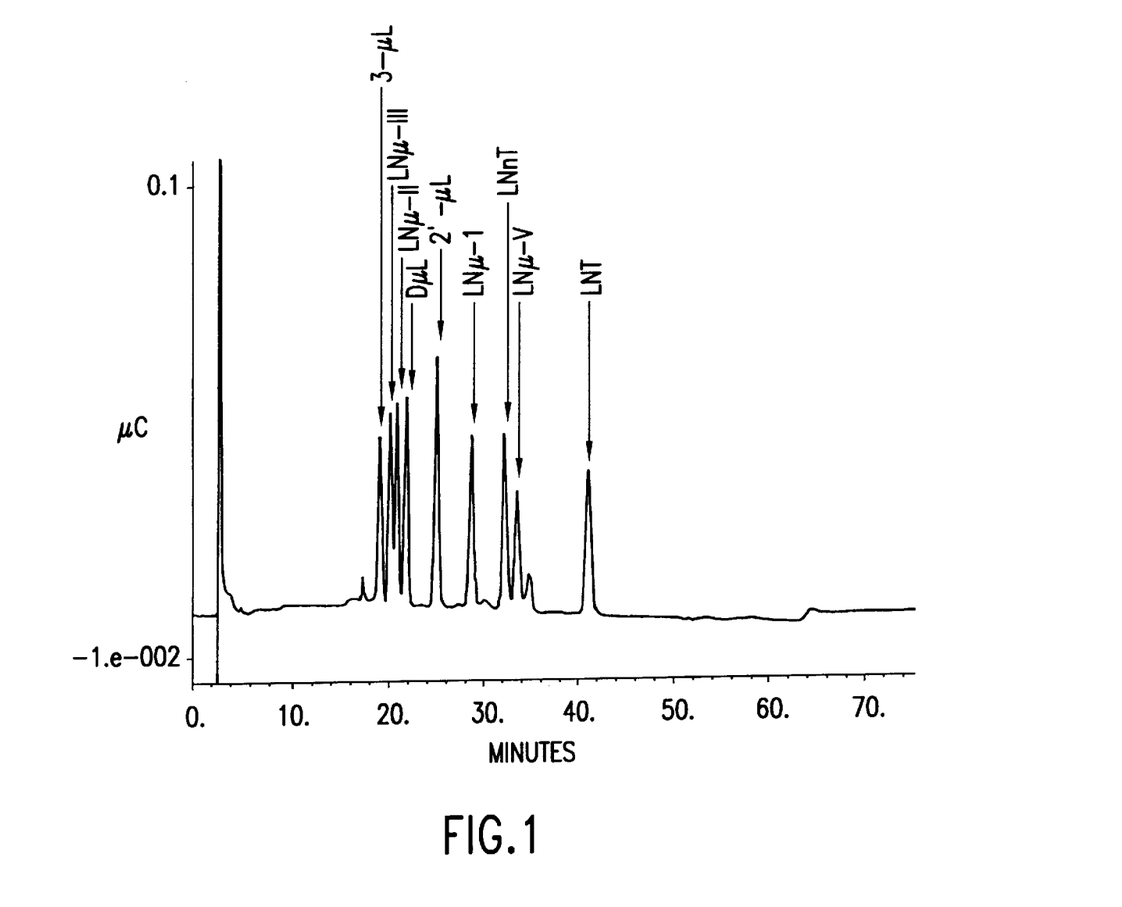
FIG. 1 shows a chromatogram of nine oligosaccharides quantitated from human milk.
Figure 2A:
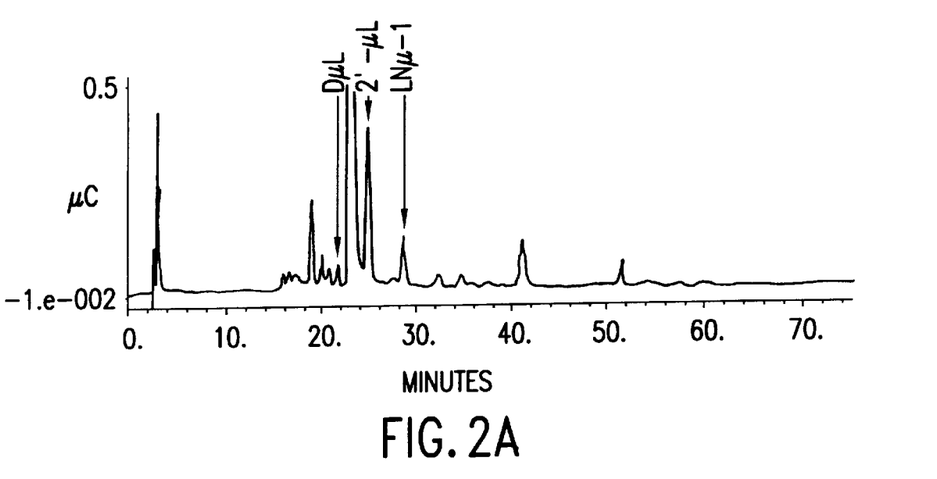
FIG. 2A shows the oligosaccharide profile of human milk from a secretor.
Figure 2B:
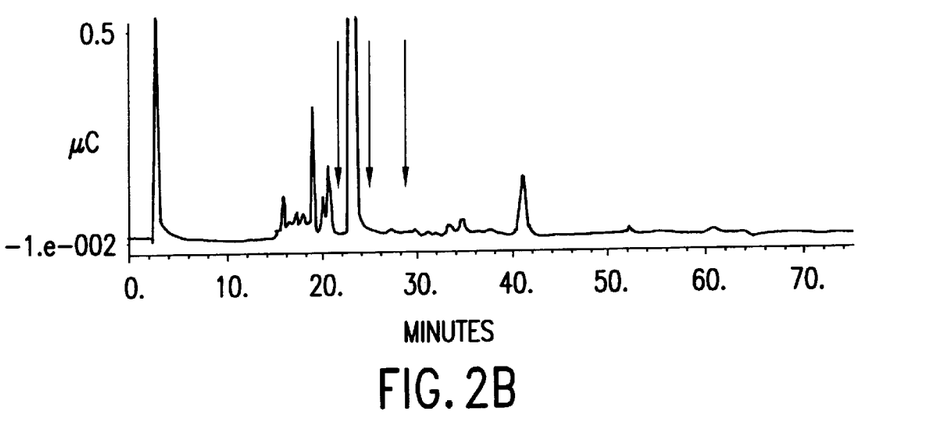
FIG. 2B shows the oligosaccharide profile of human milk from a non-secretor.
Figure 3A:
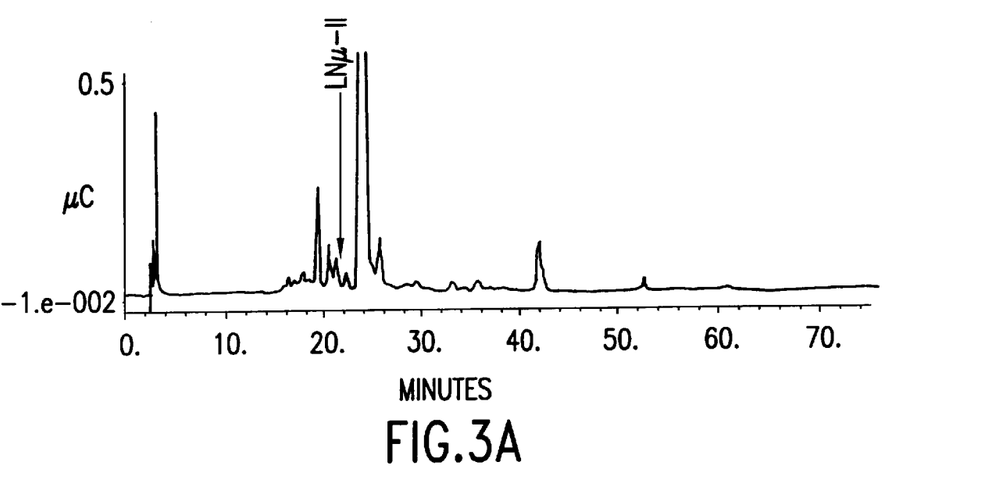
FIG. 3A shows the oligosaccharide profile of human milk from a Lewis positive donor.
Figure 3B:
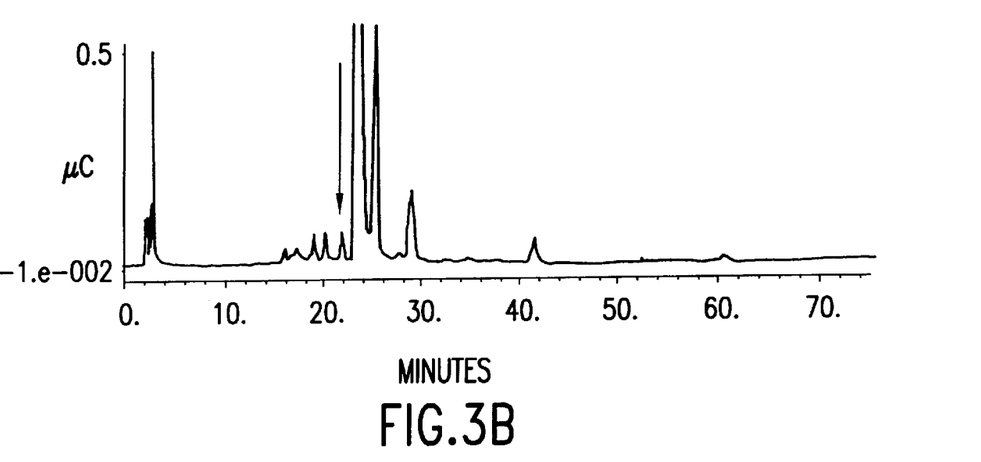
FIG. 3B shows the oligosaccharide profile from a Lewis negative donor.

FIG. 1 shows a standard chromatogram of nine oligosaccharides found in human milk. The elution/retention of each oligosaccharide was determined using individual carbohydrate standards. Seven of the nine carbohydrates studied were well-resolved from their neighboring peaks: 3-Fucosyllactose (3-FL, Galβ-4(Fucα1-3)Glc) co-eluted with the minor component Lacto-difucohexaose I (LDFH-I, Fucα1-2Galβ1-3(Fucα1-4)GlcNAcβ1-3Galβ1-4Glc) in those samples from donors who secreted the Lewis gene; and LNT co-eluted with the minor component Lacto-N-neohexaose, (LNnH, Galβ1-4GlcNAcβ1-3(Galβ1-4GlcNAcβ1-6)Galβ1-4Glc). FIG. 2 shows two chromatograms comparing the oligosaccharide profiles of human milk from secretor (FIG. 2A) and nonsecretor donors (FIG. 2B). The clear presence or absence of 2'-FL, DFL, and LNF-I, as predicted by the presence or absence of the fucosyltransferase necessary to place fucose in an alpha 1–2 position on a terminal galactose, can be noted in the chromatograms. Secretors accounted for 199 of the 232 subjects tested, or 86% of the population. FIG. 3 shows two chromatograms comparing human milk from Lewis Positive (FIG. 3A) and Lewis Negative (FIG. 3B) subjects. Lewis positive individuals possess the fucosyltransferase needed to place fucose in the alpha 1–4 position of N-Acetylglucosamine. There were 224 (or 97%) Lewis Positive donors in this group.

A summary of the data collected is provided below in Table I. Milk from a total of 232 donors was used, with several donors contributing a series of milk samples. These samples were used to determine the change in concentration of each oligosaccharide throughout the lactation period. For the purpose of developing a normal concentration average of the sugars, their values were averaged.

TABLE I

Oligosaccharide Concentration Ranges in All Samples Analyzed

| | Average (ppm) | Minimum (ppm) | Maximum (ppm) | Median (ppm) | n:* | %:** |
|---|---|---|---|---|---|---|
| 3-FL: | 1,456.00 | 0.00 | 3,457.00 | 1,472.00 | 230.00 | 99.10 |
| LNF-III: | 578.00 | 0.00 | 2,108.00 | 507.00 | 231.00 | 99.60 |
| LNF-II: | 429.00 | 0.00 | 1,470.00 | 361.00 | 184.00 | 79.30 |
| DFL: | 494.00 | 0.00 | 2,441.00 | 393.00 | 199.00 | 85.80 |
| Lactose: | 68,440.00 | 26,910.00 | 124,370.00 | 66,960.00 | 232.00 | 100.00 |
| 2'-FL: | 2,240.00 | 0.00 | 4,484.00 | 2,260.00 | 200.00 | 86.20 |
| LNF-I: | 912.00 | 0.00 | 3,291.00 | 845.00 | 200.00 | 86.20 |
| LNnT: | 279.00 | 0.00 | 831.00 | 258.00 | 229.00 | 98.70 |
| LNF-V: | 154.00 | 0.00 | 2,265.00 | 120.00 | 153.00 | 65.90 |
| LNT: | 744.00 | 0.00 | 2,740.00 | 687.00 | 231.00 | 99.60 |

"n:*" indicates the number of samples tested which contained the oligosaccharide in question.
"%:**" is the percentage of samples that contained the oligosaccharide. Averages were calculated for only those samples which contained the sugar; if a sample did not contain it, a "zero" value was not included.

The values found above in Table 1 vary markedly from those accepted in the literature. In the most recent publication on this matter, Thurl et al. (*Analytical Biochemistry* 235 (1996) 202–206), published a method that separates and quantitates the individual human milk oligosaccharides, including neutral and acidic oligosaccharides, and lactose. In this publication, Thurl et al. describe the method used and five results for one donor. Table II below compares the results from the Thurl et al. study with the results in Table I, as well as results from two other studies that actually quantitated the individual sugars. The two other studies are described in Kobata, A., *Methods in Enzymology* 28 (1972) 262–271 and Kunz, C. et al., *Acta Paediatr.* 82 (1993) 903–912. The results of the present invention presented in Table I averaged the concentrations for a large number of random subjects. The other studies discussed above determined the values from at most 4 samples from different subjects.

TABLE II

Comparison of Average Oligosaccharide Concentrations from Several Sources (in mg/L)

|          | Present Invention | Thurl et al. | Kunz et al. | Kobata |
|----------|------------------:|-------------:|------------:|-------:|
| 3-FL:    | 1,456.00          | 460.00       |             |        |
| LNF-III: | 578.00            | 280.00       |             | 50.00  |
| LNF-II:  | 429.00            | 200.00       | 500–1000    | 20.00  |
| DFL:     | 494.00            | 170.00       |             |        |
| 2'-FL:   | 2,240.00          | 184.00       |             |        |
| LNF-I:   | 912.00            | 670.00       | 1000–1500   | 200.00 |
| LNnT:    | 279.00            | 110.00       |             | 60.00  |
| LNF-V:   | 154.00            |              |             |        |
| LNT:     | 744.00            | 860.00       | 500–1500    | 410.00 |

The method used by Kobata et al. employed delipidization by centrifugation, protein removal by ethanol extraction, and a complicated series of paper and thin layer chromatography steps in order to arrive at the listed concentrations. This method takes close to one month to complete, and leaves much room for error and losses or degradation of some of the more complex compounds. Thurl et al. used a heat treatment to deactivate any biohazardous materials in the milk that may be present, a step which may also degrade the heat-sensitive fucosylated sugars. It has been shown that heat and an acidic pH may degrade even the more basic of oligosaccharides, including LNnT and the fucosyllactoses. Each of the oligosaccharides quantitated in the present invention were put through the entire procedure (using authentic standards) and analyzed, with no noticeable losses in any step. Furthermore, human milk samples were spiked with several of the standards at elevated levels, with excellent recoveries throughout the procedure.

EXAMPLE 3

Ready-to-Feed Infant Formulation Containing Oligosaccharides

A ready-to-feed infant formulation containing the oligosaccharides 3-fucosyllactose, lacto-N-fucopentaose III, lacto-N-fucopentaose II, difucosyllactose, 2' fucosyllactose, lacto-N-fucopentaose I, Lacto-N-neoTetraose, lacto-N-fucopentaose V and lacto-N-tetraose has the following composition (5 fluid ounces=100 Cal):

| Protein                 | 2.14 g     |
|-------------------------|------------|
| Fat                     | 5.40 g     |
| Carbohydrates           | 10.7 g     |
| 3-Fucosyllactose        | 296.0 g    |
| Lacto-N-Fucopentaose III| 72.0 g     |
| Lacto-N-Fucopentaose II | 51.3 g     |
| Difucosyllactose        | 55.8 g     |
| 2'Fucosyllactose        | 318.1 g    |
| Lacto-N-Fucopentaose I  | 120.0 g    |
| Lacto-N-neoTetraose     | 36.6 g     |
| Lacto-N-Fucopentaose V  | 17.0 g     |
| Lacto-N-Tetraose        | 97.6 g     |
| Water                   | 133.0 g    |
| Linoleic Acid           | 1300.0 mg  |

| Vitamin A | 300 IU |
|-----------|--------|
| Vitamin D | 60 IU  |
| Vitamin E | 3.0 IU |

-continued

| Vitamin K              | 8 mcg     |
|------------------------|-----------|
| Thiamine (Vit. $B_1$)  | 100 mcg   |
| Riboflavin (Vit. $B_2$)| 150 mcg   |
| Vitamin $B_6$          | 60 mcg    |
| Vitamin $B_{12}$       | 0.25 mcg  |
| Niacin                 | 1050 mcg  |
| Folic Acid (Folacin)   | 15 mcg    |
| Pantothenic Acid       | 450 mcg   |
| Biotin                 | 4.4 mcg   |
| Vitamin C (Ascorbic Acid) | 9 mg   |
| Choline                | 16 mg     |
| Inositol               | 4.7 mg    |

| Calcium    | 73 mg    |
|------------|----------|
| Phosphorus | 56 mg    |
| Magnesium  | 7.5 mg   |
| Iron       | 1.8 mg   |
| Zinc       | 0.75 mg  |
| Manganese  | 30 mcg   |
| Copper     | 75 mcg   |
| Iodine     | 15 mcg   |
| Sodium     | 44 mg    |
| Potassium  | 108 mg   |
| Chloride   | 62 mg    |

The above-described infant formulation can be used when an infant formula is needed, such as if the decision is made to discontinue breast feeding before age 1 year, if a supplement to breast feeding is needed or as a routine feeding if breast feeding is not adopted.

EXAMPLE 4

Ready-to-Feed Infant Formulation Containing Oligosaccharides

A ready-to-feed infant formulation containing the oligosaccharides 3-fucosyllactose, lacto-N-fucopentaose III, lacto-N-fucopentaose II, difucosyllactose, 2' fucosyllactose, lacto-N-fucopentaose I, Lacto-N-neoTetraose, lacto-N-fucopentaose V and lacto-N-tetraose has the following composition (5 fluid ounces=100 Cal):

| Protein                 | 2.14 g     |
|-------------------------|------------|
| Fat                     | 5.40 g     |
| Carbohydrates           | 10.7 g     |
| 3-Fucosyllactose        | 206.0 g    |
| Lacto-N-Fucopentaose III| 72.0 g     |
| Lacto-N-Fucopentaose II | 51.3 g     |
| Difucosyllactose        | 55.8 g     |
| 2'Fucosyllactose        | 318.1 g    |
| Water                   | 133.0 g    |
| Linoleic Acid           | 1300.0 mg  |

| Vitamins:              | Per 100 Cal: |
|------------------------|--------------|
| Vitamin A              | 300 IU       |
| Vitamin D              | 60 IU        |
| Vitamin E              | 3.0 IU       |
| Vitamin K              | 8 mcg        |
| Thiamine (Vit. $B_1$)  | 100 mcg      |

-continued

| Vitamins: | Per 100 Cal: |
|---|---|
| Riboflavin (Vit. B$_2$) | 150 mcg |
| Vitamin B$_6$ | 60 mcg |
| Vitamin B$_{12}$ | 0.25 mcg |
| Niacin | 1050 mcg |
| Folic Acid (Folacin) | 15 mcg |
| Pantothenic Acid | 450 mcg |
| Biotin | 4.4 mcg |
| Vitamin C (Ascorbic Acid) | 9 mg |
| Choline | 16 mg |
| Inositol | 4.7 mg |

| | |
|---|---|
| Calcium | 73 mg |
| Phosphorus | 56 mg |
| Magnesium | 7.5 mg |
| Iron | 1.8 mg |
| Zinc | 0.75 mg. |
| Manganese | 30 mcg |
| Copper | 75 mcg |
| Iodine | 15 mcg |
| Sodium | 44 mg |
| Potassium | 108 mg |
| Chloride | 62 mg |

The above-described infant formulation can be used when an infant formula is needed, such as if the decision is made to discontinue breast feeding before age 1 year, if a supplement to breast feeding is needed or as a routine feeding if breast feeding is not adopted.

EXAMPLE 5

Ready-to-Feed Infant Formulation Containing Oligosaccharides

A ready-to-feed infant formulation containing the oligosaccharides 3-fucosyllactose, lacto-N-fucopentaose III, lacto-N-fucopentaose II, difucosyllactose, 2' fucosyllactose, lacto-N-fucopentaose I, Lacto-N-neoTetraose, lacto-N-fucopentaose V and lacto-N-tetraose has the following composition (5 fluid ounces=100 Cal):

| | |
|---|---|
| Protein | 2.14 g |
| Fat | 5.40 g |
| Carbohydrates | 10.7 g |
| Lacto-N-Fucopentaose I | 120.0 g |
| Lacto-N-neoTetraose | 36.6 g |
| Lacto-N-Fucopentaose V | 17.0 g |
| Lacto-N-Tetraose | 97.6 g |
| Water | 133.0 g |
| Linoleic Acid | 1300.0 mg |

| | |
|---|---|
| Vitamin A | 300 IU |
| Vitamin D | 60 IU |
| Vitamin E | 3.0 IU |
| Vitamin K | 8 mcg |
| Thiamine (Vit. B$_1$) | 100 mcg |
| Riboflavin (Vit.B$_2$) | 150 mcg |
| Vitamin B$_6$ | 60 mcg |
| Vitamin B$_{12}$ | 0.25 mcg |

-continued

| | |
|---|---|
| Niacin | 1050 mcg |
| Folic Acid (Folacin) | 15 mcg |
| Pantothenic Acid | 450 mcg |
| Biotin | 4.4 mcg |
| Vitamin C (Ascorbic Acid) | 9 mg |
| Choline | 16 mg |
| Inositol | 4.7 mg |

| | |
|---|---|
| Calcium | 73 mg |
| Phosphorus | 56 mg |
| Magnesium | 7.5 mg |
| Iron | 1.8 mg |
| Zinc | 0.75 mg |
| Manganese | 30 mcg |
| Copper | 75 mcg |
| Iodine | 15 mcg |
| Sodium | 44 mg |
| Potassium | 108 mg |
| Chloride | 62 mg |

The above-described infant formulation can be used whenever infant formula is needed, such as if the decision is made to discontinue breast feeding before age 1 year, if a supplement to breast feeding is needed or as a routine feeding if breast feeding is not adopted.

EXAMPLE 6

Ready-to-Feed Soy Infant Formulation Containing Oligosaccharides

A ready-to-feed soy infant formulation containing the oligosaccharides 3-fucosyllactose, lacto-N-fucopentaose III, lacto-N-fucopentaose II, difucosyllactose, 2' fucosyllactose, lacto-N-fucopentaose I, Lacto-N-neoTetraose, lacto-N-fucopentaose V and lacto-N-tetraose has the following composition (5 fluid ounces=100 Cal):

| Nutrients: | Per 100 Cal: |
|---|---|
| Protein | 2.45 g |
| Fat | 5.46 g |
| Carbohydrates | 10.3 g |
| 3-Fucosyllactose | 206.0 g |
| 2'Fucosyllactose | 318.1 g |
| Lacto-N-neo Tetraose | 36.6 g |
| Lacto-N-Fucopentaose V | 17.0 g |
| Lacto-N-Tetraose | 97.6 g |
| Water | 133.0 g |
| Linoleic Acid | 1300.0 mg |

| | |
|---|---|
| Vitamin A | 300 IU |
| Vitamin D | 60 IU |
| Vitamin E | 3.0 IU |
| Vitamin K | 15 mcg |
| Thiamine (Vit. B$_1$) | 60 mcg |
| Riboflavin (Vit. B$_2$) | 90 mcg |
| Vitamin B$_6$ | 60 mcg |
| Vitamin B$_{12}$ | 0.45 mcg |
| Niacin | 1350 mcg |
| Folic Acid | 15 mcg |

-continued

| | | |
|---|---|---|
| (Folacin) | | |
| Pantothenic Acid | 750 | mcg |
| Biotin | 4.5 | mcg |
| Vitamin C | 9 | mg |
| (Ascorbic Acid) | | |
| Choline | 8 | mg |
| Inositol | 5 | mg |

| | | |
|---|---|---|
| Calcium | 105 | mg |
| Phosphorus | 75 | mg |
| Magnesium | 6 | mg |
| Iron | 0.22 | mg |
| Zinc | 0.75 | mg |
| Manganese | 5 | mcg |
| Copper | 90 | mcg |
| Iodine | 9 | mcg |
| Sodium | 27 | mg |
| Potassium | 105 | mg |
| Chloride | 64 | mg |

The above-described infant formulation can be used when soy feeding is desired and an infant formula is needed, such as if the decision is made to discontinue breast feeding before age 1 year, if a supplement to breast feeding is needed or as a routine feeding if breast feeding is not adopted.

EXAMPLE 7

Ready-to-Feed Soy Infant Formulation Containing Oligosaccharides

A ready-to-feed soy infant formulation containing the oligosaccharides 3-fucosyllactose, lacto-N-fucopentaose III, lacto-N-fucopentaose II, difucosyllactose, 2' fucosyllactose, lacto-N-fucopentaose I, Lacto-N-neoTetraose, lacto-N-fucopentaose V and lacto-N-tetraose has the following composition (5 fluid ounces=100 Cal):

| Nutrients: | Per 100 Cal: | |
|---|---|---|
| Protein | 2.45 | g |
| Fat | 5.46 | g |
| Carbohydrates | 10.3 | g |
| 2'Fucosyllactose | 320.9 | g |
| Lacto-N-neoTetraose | 39.6 | g |
| Lacto-N-Tetraose | 105.6 | g |
| Water | 133.0 | g |
| Linoleic Acid | 1300.0 | mg |

| Vitamins: | Per 100 Cal: | |
|---|---|---|
| Vitamin A | 300 | IU |
| Vitamin D | 60 | IU |
| Vitamin E | 3.0 | IU |
| Vitamin K | 15 | mcg |
| Thiaimine (Vit. B$_1$) | 60 | mcg |
| Riboflavin (Vit. B$_2$) | 90 | mcg |
| Vitamin B$_6$ | 60 | mcg |
| Vitamin B$_{12}$ | 0.45 | mcg |
| Niacin | 1350 | mcg |
| Folic Acid | 15 | mcg |
| (Folacin) | | |
| Pantothenic Acid | 750 | mcg |

-continued

| Vitamins: | Per 100 Cal: | |
|---|---|---|
| Biotin | 4.5 | mcg |
| Vitamin C | 9 | mg |
| (Ascorbic Acid) | | |
| Choline | 8 | mg |
| Inositol | 5 | mg |

| Minerals: | Per 100 Cal: | |
|---|---|---|
| Calcium | 105 | mg |
| Phosphorus | 75 | mg |
| Magnesium | 6 | mg |
| Iron | 0.22 | mg |
| Zinc | 0.75 | mg |
| Manganese | 5 | mcg |
| Copper | 90 | mcg |
| Iodine | 9 | mcg |
| Sodium | 27 | mg |
| Potassium | 105 | mg |
| Chloride | 64 | mg |

The above-described infant formulation can be used when soy feeding is desired and an infant formula is needed, such as if the decision is made to discontinue breast feeding before age 1 year, if a supplement to breast feeding is needed or as a routine feeding if breast feeding is not adopted.

EXAMPLE 8

Ready-to-Feed Soy Infant Formulation Containing Oligosaccharides

A ready-to-feed soy infant formulation containing the oligosaccharides 3-fucosyllactose, lacto-N-fucopentaose III, lacto-N-fucopentaose II, difucosyllactose, 2' fucosyllactose, lacto-N-fucopentaose I, Lacto-N-neoTetraose, lacto-N-fucopentaose V and lacto-N-tetraose has the following composition (5 fluid ounces=100 Cal):

| Nutrients: | Per 100 Cal: | |
|---|---|---|
| Protein | 2.45 | g |
| Fat | 5.46 | g |
| Carbohydrates | 10.3 | g |
| 3-Fucosyllactose | 209.0 | g |
| Lacto-N-Fucopentaose III | 82.1 | g |
| 2'Fucosyllactose | 320.9 | g |
| Lacto-N-Fucopentaose I | 234.3 | g |
| Lacto-N-neoTetraose | 39.6 | g |
| Lacto-N-Fucopentaose V | 21.9 | g |
| Lacto-N-Tetraose | 105.6 | g |
| Water | 133.0 | g |
| Linoleic Acid | 1300.0 | mg |

| Vitamins: | Per 100 Cal: | |
|---|---|---|
| Vitamin A | 300 | IU |
| Vitamin D | 60 | IU |
| Vitamin E | 3.0 | IU |
| Vitamin K | 15 | mcg |
| Thiaimine (Vit. B$_1$) | 60 | mcg |
| Riboflavin (Vit. B$_2$) | 90 | mcg |

-continued

| Vitamins: | Per 100 Cal: |
|---|---|
| Vitamin $B_6$ | 60 mcg |
| Vitamin $B_{12}$ | 0.45 mcg |
| Niacin | 1350 mcg |
| Folic Acid (Folacin) | 15 mcg |
| Pantothenic Acid | 750 mcg |
| Biotin | 4.5 mcg |
| Vitamin C (Ascorbic Acid) | 9 mg |
| Choline | 8 mg |
| Inositol | 5 mg |

| Minerals: | Per 100 Cal: |
|---|---|
| Calcium | 105 mg |
| Phosphorus | 75 mg |
| Magnesium | 6 mg |
| Iron | 0.22 mg |
| Zinc | 0.75 mg |
| Manganese | 5 mcg |
| Copper | 90 mcg |
| Iodine | 9 mcg |
| Sodium | 27 mg |
| Potassium | 105 mg |
| Chloride | 64 mg |

The above-described infant formulation can be used when soy feeding is desired and an infant formula is needed, such as if the decision is made to discontinue breast feeding before age 1 year, if a supplement to breast feeding is needed or as a routine feeding if breast feeding is not adopted.

What is claimed is:

1. A synthetic nutritional composition comprising:
   A) at least one of the following oligosaccharides selected from the group consisting of:
      from about 130 to about 3500 mg/L of 3-fucosyllactose;
      from about 50 to about 2500 mg/L of difucosyllactose; and
      from about 15 to about 2300 mg/L of lacto-N-fucopentaose V; and
   B) edible macronutrients wherein said edible macronutrients are formulated for feeding to a human.

2. A synthetic nutritional composition comprising:
   A) at least one of the following oligosaccharides selected from the group consisting of:
      from about 130 to about 3500 mg/L of 3-fucosyllactose;
      from about 50 to about 2500 mg/L of difucosyllactose; and
      from about 15 to about 2300 mg/L of lacto-N-fucopentaose V; and
   B) one or more edible macronutrients formulated for feeding to a human wherein said macronutrients are selected from the group consisting of coconut oil, soy oil, mono- and diglycerides, glucose, food grade lactose, electrodialysed whey and electrodialysed skim milk, milk whey, and soy protein.

3. A synthetic nutritional composition comprising:
   A) at least one of the following oligosaccharides selected from the group consisting of:
      from about 130 to about 3500 mg/L of 3-fucosyllactose;
      from about 50 to about 2500 mg/L of difucosyllactose; and
      from about 15 to about 2300 mg/L of lacto-N-fucopentaose V;
   B) at least one of vitamins A, C, D, E, and B complex; and
   C) one or more edible macronutrients formulated for feeding to a human wherein said macronutrients are selected from the group consisting of coconut oil, soy oil, mono- and diglycerides, glucose, food grade lactose, electrodialysed whey and electrodialysed skim milk, milk, whey, and soy protein.

4. A composition comprising:
   A) at least one of the following oligosaccharides selected from the group consisting of:
      from about 130 to about 3500 mg/L of 3-fucosyllactose;
      from about 50 to 2500 mg/L of difucosyllactose and
      from about 15 to about 2300 mg/L of lacto-N-fucopentaose V;
   B) one or more edible macronutrients formulated for feeding to a human selected from the group consisting of coconut oil, soy oil, mono- and diglycerides, glucose, food grade lactose, electrodialysed whey, electrodialysed skim milk and milk whey;
   C) one or more vitamins selected from the group consisting of A, C, D, E and B complex; and
   D) one or more minerals selected from the group consisting of calcium, magnesium, manganese, sodium, potassium, phosphorus, copper, zinc, chloride, iodine, selenium and iron.

5. The composition of claim 4 wherein the oligosaccharides are present in the composition in the following amounts:
   from about 800 to about 1750 mg/L of 3-fucosyllactose;
   from about 200 to about 1450 mg/L of difucosyllactose;
   from about 100 to about 1600 mg/L of lacto-N-fucopentaose V.

6. The composition of claim 5 wherein the oligosaccharides are present in the composition in the following amounts:
   from about 1456 to about 1472 mg/L of 3-fucosyllactose;
   from about 393 to about 494 mg/L of difucosyllactose; or
   from about 120 to about 154 mg/L of lacto-N-fucopentaose V.

* * * * *

UNITED STATES PATENT AND TRADEMARK OFFICE
CERTIFICATE OF CORRECTION

PATENT NO. : 6,146,670
DATED : November 14, 2000
INVENTOR(S) : Pedro A. Prieto et al.

It is certified that error appears in the above-identified patent and that said Letters Patent is hereby corrected as shown below:

Title page,
Showing the illustrative figure should be deleted and substitute therefore the attached title page.

Drawings,
Figs. 1, 2A and 3A, should be deleted and substitute therefore the corrected Figs. 1, 2A and 3A, as shown.
FIG.1 replace with

UNITED STATES PATENT AND TRADEMARK OFFICE
CERTIFICATE OF CORRECTION

PATENT NO. : 6,146,670
DATED : November 14, 2000
INVENTOR(S) : Pedro A. Prieto et al.

It is certified that error appears in the above-identified patent and that said Letters Patent is hereby corrected as shown below:

FIG.2A replace with

UNITED STATES PATENT AND TRADEMARK OFFICE
CERTIFICATE OF CORRECTION

PATENT NO.    : 6,146,670
DATED         : November 14, 2000
INVENTOR(S)   : Pedro A. Prieto et al.

It is certified that error appears in the above-identified patent and that said Letters Patent is hereby corrected as shown below:

FIG.3A replace with

Signed and Sealed this

Eleventh Day of June, 2002

Attest:

JAMES E. ROGAN
Attesting Officer     Director of the United States Patent and Trademark Office

United States Patent [19]

Prieto et al.

[11] Patent Number: 6,146,670
[45] Date of Patent: *Nov. 14, 2000

[54] NUTRITIONAL FORMULATIONS CONTAINING OLIGOSACCHARIDES

[75] Inventors: Pedro A. Prieto, West Worthington; Stephen J. Kirchner, Westerville; Renée M. Erney, Columbus, all of Ohio

[73] Assignee: Abbott Laboratories, Abbott Park, Ill.

[ * ] Notice: This patent is subject to a terminal disclaimer.

[21] Appl. No.: 09/216,056

[22] Filed: Dec. 18, 1998

Related U.S. Application Data

[63] Continuation of application No. 08/829,157, Mar. 31, 1997, Pat. No. 6,045,854.
[51] Int. Cl.[7] .............................. A23L 1/29; A23L 1/302; A23L 1/303; A23L 1/304
[52] U.S. Cl. ........................ 426/72; 426/73; 426/74; 426/580; 426/658; 426/801
[58] Field of Search .................... 426/580, 801, 426/658, 72, 73, 74

[56] References Cited

U.S. PATENT DOCUMENTS

| | | | |
|---|---|---|---|
| 4,919,961 | 4/1990 | Lundblad | 426/580 |
| 4,925,680 | 5/1990 | Schweikhardt | 426/585 |
| 4,963,384 | 10/1990 | Heine | 426/582 |
| 5,095,106 | 3/1992 | Gaffar et al. | 426/658 |
| 5,750,176 | 5/1998 | Prieto et al. | 426/580 |

FOREIGN PATENT DOCUMENTS

| | | |
|---|---|---|
| 0313533 | 4/1989 | European Pat. Off. . |
| 9116449 | 10/1991 | WIPO . |
| 9610086 | 4/1996 | WIPO . |

OTHER PUBLICATIONS

A. Kobata et al., "Oligosaccharides of Human Milk II" Journal of Biological Chemistry vol. 244, No. 20, Oct. 25, 1969, MD US, pp. 5496–5502, XP002071966.
S. Thurl et al., "Variations of Neutral Oligosaccharides and Lactose in Human Milk During the Feeding" vol. 32, No. 41, 1993, pp. 262–269, XP002071967.
Patent Abstracts of Japan, vol. 096, No. 006, Jun. 28, 1996 & JP 08 038064A Feb. 13, 1996.
Thurl, S. et al., Journal of Chromatography 568 (1991) 291–300.
Andersson, B. et al., J. Infect. Dis. 153 (1986) 232–237.
Kobata, A. et al., Methods in Enzymology 28 (1972) 262–271.
Kunz, C. et al., Acta Paediatr. 82 (1993) 903–912.
Thurl, S. et al., Analytical Biochemistry 235 (1996) 202–206.

Primary Examiner—Helen Pratt
Attorney, Agent, or Firm—Cheryl L. Becker

[57] ABSTRACT

A nutritional formulation containing at least one of the following oligosaccharides: from about 400 to about 3500 mg/L of 3-fucosyllactose; from about 200 to about 2200 mg/L of lacto-N-fucopentaose III; from about 100 to about 1500 mg/L of lacto-N-fucopentaose II; from about 100 to about 2500 mg/L of difucosyllactose; from about 500 to about 4500 mg/L of 2' fucosyllactose; from about 250 to about 3300 mg/L of lacto-N-fucopentaose I; from about 100 to about 900 mg/L of Lacto-N-neoTetraose; from about 50 to about 2300 mg/L of lacto-N-fucopentaose V; or from about 300 to about 2800 mg/L of lacto-N-tetraose.

6 Claims, 3 Drawing Sheets